US009145817B2

(12) United States Patent
Ohno

(10) Patent No.: US 9,145,817 B2
(45) Date of Patent: Sep. 29, 2015

(54) REDUCING AGENT INJECTION VALVE ABNORMALITY DETECTION UNIT AND REDUCING AGENT SUPPLY APPARATUS

(75) Inventor: Shigehiro Ohno, Saitama (JP)

(73) Assignee: Bosch Corporation, Tokyo (JP)

( * ) Notice: Subject to any disclaimer, the term of this patent is extended or adjusted under 35 U.S.C. 154(b) by 86 days.

(21) Appl. No.: 13/882,348

(22) PCT Filed: Jul. 27, 2011

(86) PCT No.: PCT/JP2011/067023
§ 371 (c)(1),
(2), (4) Date: Apr. 29, 2013

(87) PCT Pub. No.: WO2012/063530
PCT Pub. Date: May 18, 2012

(65) Prior Publication Data
US 2013/0213014 A1      Aug. 22, 2013

(30) Foreign Application Priority Data

Nov. 8, 2010  (JP) .................................. 2010-250181

(51) Int. Cl.
| | |
|---|---|
| *F01N 3/00* | (2006.01) |
| *F01N 11/00* | (2006.01) |
| *F01N 3/08* | (2006.01) |
| *F01N 3/20* | (2006.01) |

(52) U.S. Cl.
CPC .............. *F01N 11/00* (2013.01); *F01N 3/0842* (2013.01); *F01N 3/2066* (2013.01);
(Continued)

(58) Field of Classification Search
USPC .................... 60/274, 276, 277, 286, 295, 303
See application file for complete search history.

(56) References Cited

U.S. PATENT DOCUMENTS

| 6,167,698 B1 * | 1/2001 | King et al. ....................... 60/286 |
| 7,571,599 B2 * | 8/2009 | Hirata .............................. 60/286 |

(Continued)

FOREIGN PATENT DOCUMENTS

| CN | 101617105 | 12/2009 |
| CN | 101688454 | 3/2010 |

(Continued)

OTHER PUBLICATIONS

International Search Report for Application No. PCT/JP2011/067023 dated Oct. 25, 2011 (2 pages).

*Primary Examiner* — Binh Q Tran
(74) *Attorney, Agent, or Firm* — Michael Best & Friedrich LLP

(57) ABSTRACT

[Problem] To provide a reducing agent injection valve abnormality detection unit capable of precisely determining whether or not a reducing agent injection valve is abnormally stuck, and a reducing agent supply apparatus.
[Means for Resolution] The reducing agent injection valve abnormality detection unit includes: a reducing agent collection control means for, when an instruction for opening the reducing agent injection valve has been issued, performing control so that the reducing agent in the reducing spent passage is collected into the storage tank; a reducing agent filling control means for, when an instruction for closing the reducing agent injection valve has been issued after the control for collecting the reducing agent, performing control so that the reducing agent passage is refilled with the reducing agent; and an abnormality determination means for determining whether or not the reducing agent injection valve is abnormally stuck, based on change in the pressure in the reducing agent passage during the control for refilling with the reducing agent.

4 Claims, 10 Drawing Sheets

(52) U.S. Cl.
CPC .. *B01D 2251/208* (2013.01); *B01D 2251/2067* (2013.01); *F01N 3/208* (2013.01); *F01N 2550/05* (2013.01); *F01N 2610/02* (2013.01); *F01N 2610/14* (2013.01); *F01N 2610/146* (2013.01); *F01N 2610/1493* (2013.01); *F01N 2900/1808* (2013.01); *Y02T 10/24* (2013.01); *Y02T 10/47* (2013.01)
USPC ............... 60/277; 60/276; 60/286; 60/295; 60/303

(56) References Cited

U.S. PATENT DOCUMENTS

| | | | |
|---|---|---|---|
| 8,215,102 B2 * | 7/2012 | Yokota | 60/286 |
| 8,240,130 B2 * | 8/2012 | Sawada et al. | 60/277 |
| 8,387,366 B2 * | 3/2013 | Ohno | 60/277 |

FOREIGN PATENT DOCUMENTS

| | | |
|---|---|---|
| CN | 101821485 | 9/2010 |
| JP | 2002129945 | 5/2002 |
| JP | 2002213231 | 7/2002 |
| JP | 2007509275 | 4/2007 |
| JP | 2008101564 | 5/2008 |
| JP | 2008169770 | 7/2008 |
| JP | 2011117440 | 6/2011 |
| WO | 2009110130 | 9/2009 |

* cited by examiner (a) DURING PURGE PROCES (b) DURING REFILL (a) DURING PURGE PROCES (b) DURING REFILL (a) DURING PURGE PROCES (b) DURING REFILL

REDUCING AGENT INJECTION VALVE ABNORMALITY DETECTION UNIT AND REDUCING AGENT SUPPLY APPARATUS

BACKGROUND OF THE INVENTION

The present invention relates to a reducing agent injection valve abnormality detection unit for detecting an abnormality occurring on a reducing agent injection valve that injects a reducing agent in an exhaust pipe to purify nitrogen oxides in exhaust gas, and also relates to a reducing agent supply apparatus.

Conventionally, as one aspect of an exhaust gas purification apparatus for removing nitrogen oxides (hereinafter referred to as "NOx") in exhaust gas from an internal-combustion engine, an apparatus is practically used which includes: an NOx purification catalyst placed on an exhaust gas passageway and a reducing agent supply apparatus that injects a liquid reducing agent, such as an urea aqueous solution and unburnt fuel, upstream of the NOx purification catalyst.

The reducing agent supply apparatus used in such an exhaust gas purification apparatus includes: a storage tank for storing a liquid reducing agent; a pump for sucking up and pumping a reducing agent stored in the storage tank; and a reducing agent injection valve for injecting the pumped reducing agent in the exhaust pipe. Among them, the reducing agent injection valve has injection nozzles attached facing the inside of the exhaust pipe for directly injecting a reducing agent in the exhaust pipe.

Here, when an urea aqueous solution is used as a reducing agent, an urea aqueous solution is adjusted to a concentration having the lowest freezing point (e.g., 32.5% concentration with the freezing point of about −11° C.) so as not to freeze even in cold climates. However, when the concentration increases due to evaporation of solvent in an urea aqueous solution or the like reason, the freezing point increases to make an urea aqueous solution more likely to freeze. A frozen urea aqueous solution may cause a valve body to be stuck or an injection nozzle to be blocked, leading to a stuck-open or stuck-closed condition in which the injection nozzles are stuck open or stuck closed, respectively. Stuck-closed condition includes a valve body stuck with the valve closed and freezing of an urea aqueous solution in the injection nozzles (it should be noted that hereinafter "stuck-closed condition" includes "valve body stuck with the valve closed" and "blocked injection nozzles" unless otherwise specified).

Regardless of type of a reducing agent, the above-described stuck-open or stuck-closed condition may also be caused by fine particles, such as soot or the like included in exhaust gas, entering the reducing agent injection valve through the injection nozzles and attaching to a sliding part or seating part of the valve body to be solidified thereon.

Injection by the reducing agent injection valve is controlled based on an instructed injection amount determined by calculation depending on the flow rate of NOx exhausted from the internal-combustion engine or the like. So, when the reducing agent injection valve is abnormally stuck, an error may occur between an actual injection amount and the instructed injection amount in spite of control of the reducing agent injection valve depending on the instructed injection amount.

Then, for example, when the reducing agent injection valve is stuck open, too much reducing agent is supplied in the exhaust pipe, which may cause a reducing agent or a derivative component thereof to spill downstream of the catalyst or may cause a reducing agent directly to attach to the inner surface of the exhaust pipe. On the other hand, when the reducing agent injection valve is stuck closed, too little reducing agent is supplied in the exhaust pipe, which may cause the reducing efficiency of NOx to decrease and may make it difficult to collect a reducing agent into the storage tank when the internal-combustion engine stops. As such, various units configured to detect whether or not the reducing agent injection valve is abnormally stuck have been proposed (e.g., see JP A 2008 169770).

SUMMARY OF THE INVENTION

By the way, when the reducing agent injection valve is abnormally stuck, an appropriate response depends on whether the abnormally-stuck condition is a stuck-open condition or a stuck-closed condition. For example, when the reducing agent injection valve is stuck open, if the pumping condition of a reducing agent remains maintained, the reducing agent flows with no limitation, so the drive of the pump needs to be limited until the reducing agent melts. On the other hand, when the reducing agent injection valve is stuck closed, in order to allow early start of reducing agent injection, duration in which control for melting the frozen reducing agent is performed should be lengthen or the like should be done. Thus, in order to detect whether or not the reducing agent injection valve is abnormally stuck, there is a need for precise determination of whether the abnormally-stuck condition is a stuck-open condition or a stuck-closed condition.

The present inventors found that the above-described problem can be solved by performing control for collecting a reducing agent from the reducing agent passage, then performing control for refilling the reducing agent passage with the reducing agent, and then detecting whether or not the reducing agent injection valve is abnormally stuck, based on change in the pressure in the reducing agent passage during the refilling, and thus completed the invention. That is, it is an object of the present invention to provide a reducing agent injection valve abnormality detection unit capable of precisely determining whether or not a reducing agent injection valve is abnormally stuck and to provide a reducing agent supply apparatus.

According to the invention, in order to solve the above-described problem, a reducing agent injection valve abnormality detection unit for detecting whether or not a reducing agent injection valve in a reducing agent supply apparatus is abnormally stuck is provided, the reducing agent supply apparatus including: a storage tank for storing a liquid reducing agent; a pump for pumping the reducing agent; the reducing agent injection valve for injecting the reducing agent pumped by the pump in an exhaust pipe of an internal-combustion engine; and a reducing agent passage connecting the pump to the reducing agent injection valve, the reducing agent injection valve abnormality detection unit including: a reducing agent collection control means for, when an instruction for opening the reducing agent injection valve has been issued, performing control so that the reducing agent in the reducing agent passage is collected into the storage tank; a reducing agent filling control means for, when an instruction for closing the reducing agent injection valve has been issued after the control for collecting the reducing agent, performing control so that the reducing agent passage is refilled with the reducing agent; and an abnormality determination means for determining whether or not the reducing agent injection valve is abnormally stuck, based on change in the pressure in the reducing agent passage during the control for refilling with the reducing agent.

Specifically, according to the reducing agent injection valve abnormality detection unit of the invention, when an instruction for opening the reducing agent injection valve has been issued, control is temporarily performed so that the reducing agent in the reducing agent passage is collected, then, when an instruction for closing the reducing agent injection valve has been issued, control is performed so that the reducing agent passage is refilled with the reducing agent, and then, whether or not the reducing agent injection valve is abnormally stuck is determined, based on change in the pressure in the reducing agent passage during the refilling.

In this configuration, when the reducing agent injection valve is in a normal condition, the reducing agent passage is filled with gas after the control for collecting the reducing agent, and during refilling with the reducing agent, there is no way through which gas can move out, so the gas is compressed to increase the pressure. On the other hand, when the reducing agent injection valve is stuck open, the reducing agent passage is filled with gas (air and exhaust gas) after the control for collecting the reducing agent, and during refilling with the reducing agent, the gas in the reducing agent passage is discharged through injection nozzles, and the reducing agent for further refilling is discharged through the injection nozzles to increase the pressure. Furthermore, when the reducing agent injection valve is stuck closed, the reducing agent is left in the reducing agent passage also after the control for collecting the reducing agent, and also in the refilling with the reducing agent, the reducing agent is not discharged from the reducing agent passage, and the reducing agent is compressed to increase the pressure.

Since the compressibility of gas is different from that of liquid with the same pressurization, changes in the pressure occurring in stuck-open, stuck-closed and normal conditions are different from one another. Thus, according to the invention, whether or not the reducing agent injection valve is abnormally stuck can be precisely detected based on the above-described change in the pressure.

The reducing agent injection valve abnormality detection unit of the invention is preferably configured so that the abnormality determination means can determine both whether or not the reducing agent injection valve is stuck open and whether or not the reducing agent injection valve is stuck closed, based on the change in the pressure.

In the invention, since the abnormality determination means can determine both whether or not the reducing agent injection valve is stuck open and whether or not the reducing agent injection valve is stuck closed, in any case of stuck-open and stuck-closed conditions, these abnormally-stuck conditions can be distinctively detected in one-time control.

The reducing agent injection valve abnormality detection unit of the invention is preferably configured so that a determination of whether or not the reducing agent injection valve is abnormally stuck is implemented when the control for collecting the reducing agent is performed at the stop of the internal-combustion engine.

In the invention, since the control for determining whether or not the reducing agent injection valve is abnormally stuck is performed utilizing the time when the control for collecting the reducing agent is performed at the stop of the internal-combustion engine, the abnormality determination can be performed without interrupting the reducing agent injection control during the operation of the internal-combustion engine.

Another aspect of the invention is a reducing agent supply apparatus including: the reducing agent injection valve abnormality detection unit to which any of the above descriptions is applicable; a storage tank for storing a liquid reducing agent; a pump for pumping the reducing agent; a reducing agent injection valve for injecting the reducing agent pumped by the pump in an exhaust pipe of an internal-combustion engine; and a reducing agent passage connecting the pump to the reducing agent injection valve.

Thus, the reducing agent supply apparatus of the invention includes the reducing agent injection valve abnormality detection unit capable of precisely detecting whether or not the reducing agent injection valve is stuck open or stack closed, so it is possible to appropriately respond to an occurring abnormally-stuck condition, reducing the risk that the reducing agent injection control continues with the excess or deficiency of a reducing agent.

DETAILED DESCRIPTION

Embodiments of a reducing agent injection valve abnormality detection unit and a reducing agent supply apparatus of the invention are specifically described below with reference to the drawings as appropriate. However, the embodiments described below are intended to show only an aspect of the invention and not intended to limit the invention, so may be appropriately modified within the scope of the invention.

Note that, through the drawings, like numerals denote like components, and duplicative descriptions will be appropriately omitted.

1. Overall Configuration of Exhaust Gas Purification Apparatus

First, an overview of an overall configuration of an exhaust gas purification apparatus including a reducing agent injection valve abnormality detection unit in accordance with an embodiment of the invention is described.

Figure 1:
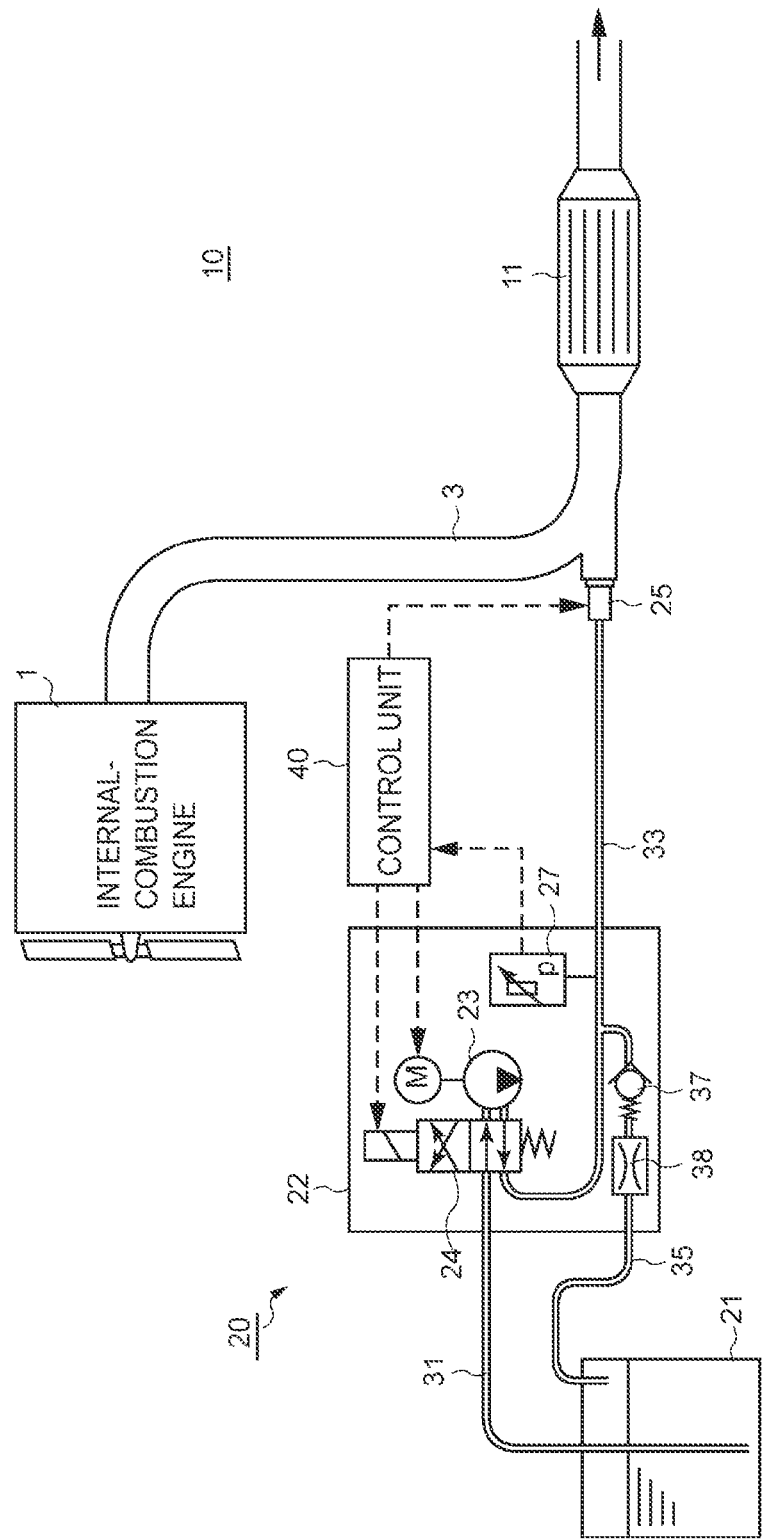
FIG. 1 is an overall diagram showing a configuration example of an exhaust gas purification apparatus in accordance with an embodiment of the invention.

FIG. 1 shows an example configuration of an exhaust gas purification apparatus 10. This exhaust gas purification apparatus 10 is an exhaust gas purification apparatus that purifies NOx in exhaust gas from an internal-combustion engine 1 included in a vehicle or the like, on NOx purification catalyst 11, with a reducing agent.

The exhaust gas purification apparatus 10 includes as main components: the NOx purification catalyst 11 provided in the middle of an exhaust pipe 3 connected to an exhausted system of the internal-combustion engine 1; a reducing agent supply apparatus 20 that supplies a reducing agent by injection in the exhaust pipe 3 upstream of the NOx purification catalyst 11; and a control processing unit 40 for controlling the operation of the reducing agent supply apparatus 20.

The NOx purification catalyst 11 is capable of speeding up a reaction between a reducing agent injected in the exhaust pipe 3 (or a reducing component produced from the reducing agent) and NOx in exhaust gas. As an NOx purification catalyst 11, an NOx selective reduction catalyst or an NOx adsorber catalyst is used.

An NOx selective reduction catalyst is a catalyst capable of adsorbing a reducing agent and using the reducing agent to selectively purify NOx in exhaust gas flowing into the catalyst. In using the NOx selective reduction catalyst, an urea aqueous solution or unburnt fuel is used as a reducing agent. When an urea aqueous solution is used as a reducing agent, urea in an urea aqueous solution is decomposed to produce ammonia ($NH_3$) that reacts with NOx, which decomposes the NOx into nitrogen ($N_2$) and water ($H_2O$). Or when unburnt fuel is used as a reducing agent, a hydro carbon (HC) in unburnt fuel reacts with NOx, which decomposes the NOx into nitrogen ($N_2$), carbon dioxide ($CO_2$) and water ($H_2O$).

An NOx adsorber catalyst is a catalyst capable of adsorbing NOx in a state of exhaust gas flowing into a catalyst having a lean air-fuel ratio (i.e., in a fuel-lean state), and, when the air-fuel ratio is switched to a rich state, discharging NOx and using hydrocarbon (HC) in exhaust gas to purify the NOx. NOx reacting with hydrocarbon (HC) is decomposed into nitrogen ($N_2$), carbon dioxide ($CO_2$) and water ($H_2O$). In using the NOx adsorber catalyst, in order to change the air-fuel ratio of exhaust gas into a rich state, unburnt fuel as a reducing agent is supplied by injection in the exhaust pipe 3.

2. Reducing Agent Supply Apparatus

The reducing agent supply apparatus 20 includes: a storage tank 21 for storing a liquid reducing agent; a pump unit 22 including a pump 23 for pumping a reducing agent; and a reducing agent injection valve 25 for injecting in the exhaust pipe 3 the reducing agent pumped from the pump 23. Among them, the pump 23 and the reducing agent injection valve 25 are drive-controlled by the control processing unit 40.

The storage tank 21 is connected to the pump 23 by a first reducing agent passage 31. The pump 23 is connected to the reducing agent injection valve 25 by a second reducing agent passage 33. The second reducing agent passage 33 is connected with a return passage 35 with the other end connected to the storage tank 21. The return passage 35 is provided with a relief valve 37 and an orifice 38 in this order from the second reducing agent passage 33 side. Furthermore, the second reducing agent passage 33 is provided with a pressure sensor 27 for detecting a pressure Pu in the second reducing agent passage 33.

Among them, for the reducing agent injection valve 25, for example, an electromagnetic valve is used in which the open/close of the valve is switched by energizing/non-energizing the valve. In the embodiment, the reducing agent injection valve 25 directly injects a reducing agent in the exhaust pipe 3. Injection nozzles are attached on the outer periphery of the exhaust pipe 3 facing the inside of the exhaust pipe 3.

For the pump 23, for example, an electric pump is used, the output Vpump of which can be adjusted by the energization amount. In the embodiment, the output Vpump of the pump 23 is feedback-controlled based on the difference ΔP between the pressure Pu in the second reducing agent passage 33 detected by the pressure sensor 27 and the target pressure Ptgt so that the pressure Pu is maintained equal to the target pressure Ptgt.

Furthermore, the pump unit 22 is provided with a reverting valve 24 for changing the flowing direction of the reducing agent pumped by the pump 23. The reverting valve 24 is, for example, an electromagnetic changeover valve driven by the control processing unit 40. In the embodiment, when the reverting valve 24 is energized, the inlet of the pump 23 is connected to the first reducing agent passage 31, and the outlet of the pump 23 is connected to the second reducing agent passage 33; and when the reverting valve 24 is not energized, the outlet of the pump 23 is connected to the first reducing agent passage 31, and the inlet of the pump 23 is connected to the second reducing agent passage 33.

Then, in controlling the reducing agent injection in the exhaust pipe 3, the reverting valve 24 is stopped being energized, and the passage is switched so that the reducing agent flows from the storage tank 21 side to the reducing agent injection valve 25 side. On the other hand, in performing a purge process of collecting the reducing agent into the storage tank 21, the reverting valve 24 is energized and the passage is switched so that the reducing agent flows from the reducing agent injection valve 25 side to the storage tank 21 side. Alternatively, the purge process may be performed by reversing the direction of rotation of the pump 23 without the reverting valve 24.

The relief valve 37 is a one-way valve for blocking the flow of the reducing agent from the storage tank 21 side to the second reducing agent passage 33, and opens when the pressure Pu in the second reducing agent passage 33 exceeds the valve opening pressure of the relief valve 37. Furthermore, in the purge process of collecting the reducing agent from the inside of the reducing agent injection valve 25 and the second reducing agent passage 33, the relief valve 37 becomes closed in response to depressurization of the inside of the second reducing agent passage 33. The orifice 38 provided downstream of the relief valve 37 is capable of preventing the pressure in the second reducing agent passage 33 from pulsating too much in response to opening/closing of the relief valve 37.

3. Control Processing Unit (Abnormality Detection Unit)

Figure 2:
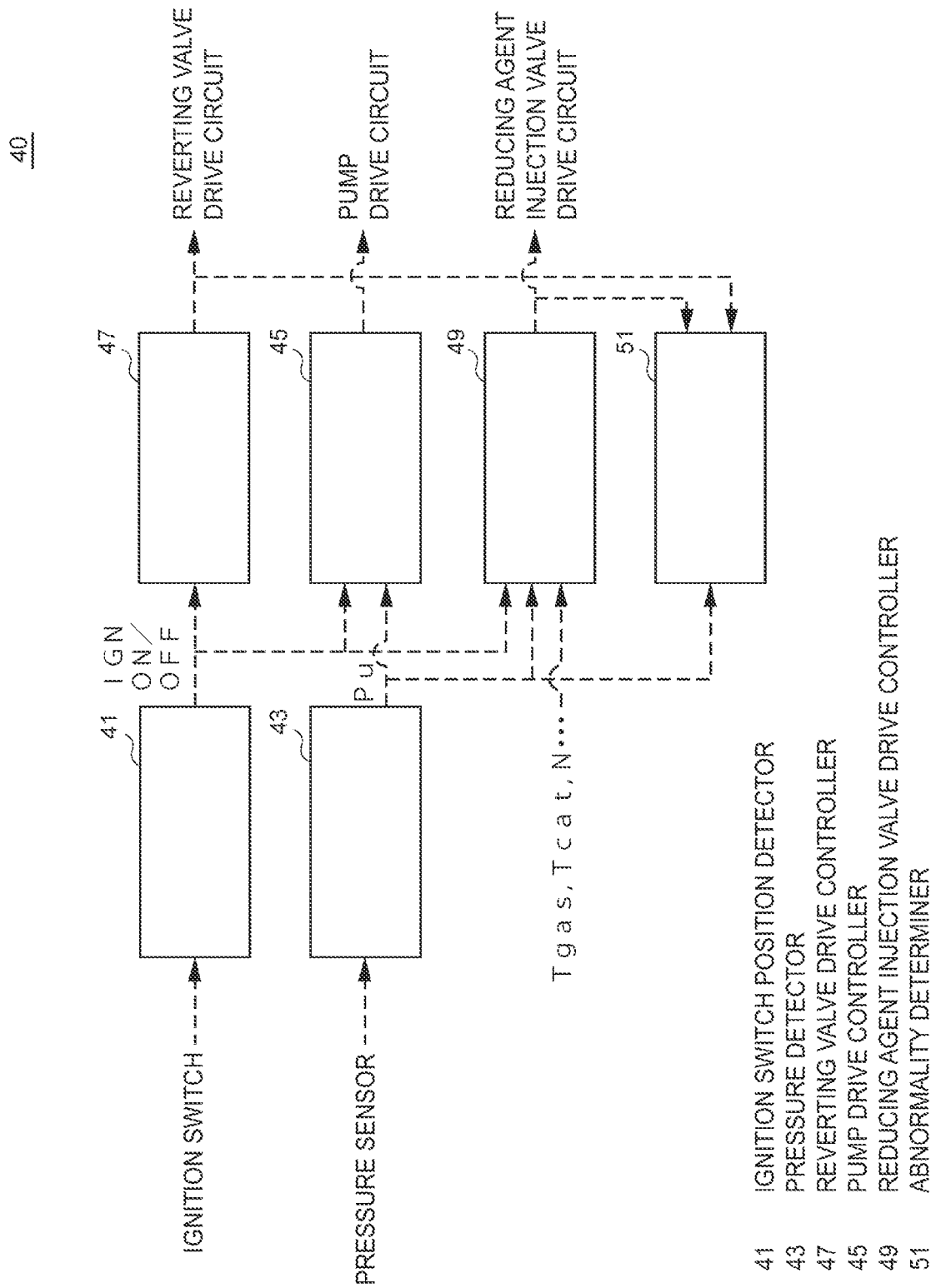
FIG. 2 is a block diagram showing a configuration example of a reducing agent injection valve abnormality detection unit in accordance with the embodiment of the invention.

FIG. 2 is a functional block diagram showing a part of the configuration of the control processing unit 40 of the embodiment, relating to operation control of the reducing agent supply apparatus 20 and abnormality detection of the reducing agent injection valve 25. The control processing unit 40 can serve as an abnormality detection unit of the reducing agent injection valve in accordance with the invention.

The control processing unit 40 is based on a well known microcomputer and includes as main components an ignition switch position detector 41, a pressure detector 43, a pump drive controller 45, a reverting valve drive controller 47, a reducing agent injection valve drive controller 49 and an abnormality determiner 51. Specifically, these components are implemented by execution of a program by the microcomputer.

In addition, the control processing unit 40 includes a memory device not shown, such as a random access memory (RAM) and a read only memory (ROM), and a drive circuit and the like not shown for energizing the pump 23, the reverting valve 24 and the reducing agent injection valve 25. Furthermore, detection signals, including a detection signal of the pressure sensor 27 and an operation signal of an ignition switch, are input to the control processing unit 40 from various sensors provided in the reducing agent supply apparatus 20, internal-combustion engine 1 and the like.

The ignition switch position detector 41 detects the position of the ignition switch based on the operation signal of the ignition switch. The pressure detector 43 reads a sensor signal of the pressure sensor 27 to detect the pressure Pu in the second reducing agent passage 33.

The pump drive controller 45, when the internal-combustion engine 1 is operating, uses the difference ΔP between the detected pressure Pu in the second reducing agent passage 33 and a preset target pressure Ptgt to determine an instructed output Vpump and uses the instructed output Vpump to drive-control the pump 23 so that the detected pressure Pu becomes equal to the target pressure Ptgt.

On the other hand, when the internal-combustion engine 1 stops, the pump drive controller 45 drive-controls the pump 23 with a predetermined output Vpump0 for a predetermined time after the ignition switch is turned off The reverting valve drive controller 47, when the internal-combustion engine 1 is operating, stops energizing the reverting valve 24 and switches the passage so that the reducing agent flows from the storage tank 21 side to the reducing agent injection valve 25 side.

On the other hand, when the internal-combustion engine 1 stops, the reverting valve drive controller 47 energizes the reverting valve 24 to perform the purge process and switches the passage so that the reducing agent flows from the reducing agent injection valve 25 side to the storage tank 21 side. However, since whether or not the reducing agent injection valve 25 is abnormally stuck is determined after the start of the purge process, the reverting valve drive controller 47, in order to cause the second reducing agent passage 33 to be refilled with the reducing agent, temporarily stops energizing the reverting valve 24 and switches the passage so that the reducing agent flows from the storage tank 21 side to the reducing agent injection valve 25 side.

In the control processing unit 40 of the embodiment, the pump drive controller 45 and the reverting valve drive controller 47 serve generally as a reducing agent collection control means and a reducing agent filling control means of the invention. Specifically, driving the pump 23 with the passage maintained so that the reducing agent flows from the reducing agent injection valve 25 side to the storage tank 21 side causes the reducing agent in the second reducing agent passage 33 to be collected into the storage tank 21. And, returning the passage to its original state after the start of the purge process causes the second reducing agent passage 33 to be refilled with the reducing agent.

The reducing agent injection valve drive controller 49, when the internal-combustion engine 1 is operating, determines the amount and duration of the energization to the reducing agent injection valve 25 to drive-control the reducing agent injection valve 25 depending on an instructed injection amount Qu of the reducing agent calculated based on an exhaust gas temperature Tgas, a catalyst temperature Tcat, an NOx concentration N downstream of the NOx purification catalyst 11, information on operation state of the internal-combustion engine 1 and the like.

On the other hand, when the internal-combustion engine 1 stops, the reducing agent injection valve drive controller 49, in order to perform the purge process, drive-controls the reducing agent injection valve 25 so that the reducing agent injection valve 25 is kept open. However, since whether or not the reducing agent injection valve 25 is abnormally stuck is determined after the start of the purge process, the reducing agent injection valve drive controller 49 causes the reducing agent injection valve 25 to be temporarily closed in accordance with the above-described switching of the reverting valve 24.

The abnormality determiner 51 performs processing for determining whether or not the reducing agent injection valve 25 is abnormally stuck. Specifically, the abnormality determiner 51, after the start of the purge process, determines whether or not the reducing agent injection valve 25 is abnormally stuck, based on the change in the pressure Pu when the second reducing agent passage 33 is refilled with the reducing agent.

Figure 3:
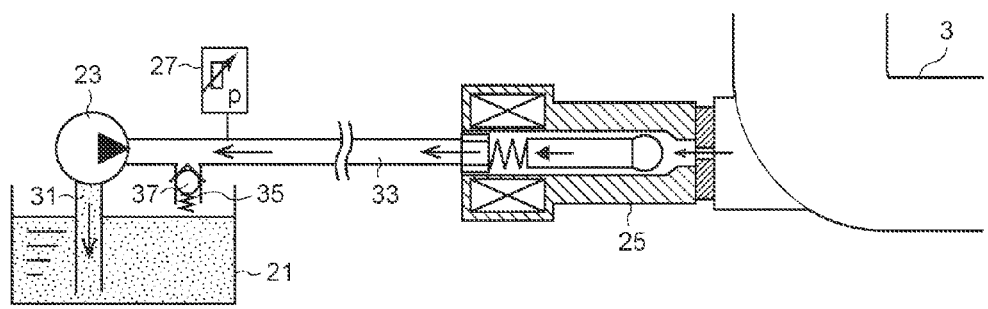
FIG. 3 is a diagram illustrating the state in a (second) reducing agent passage when a reducing agent injection valve is in a normal condition.
Figure 3:
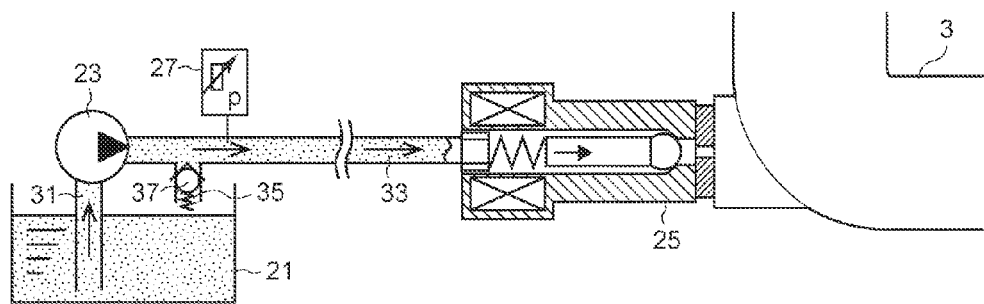
Figure 4:
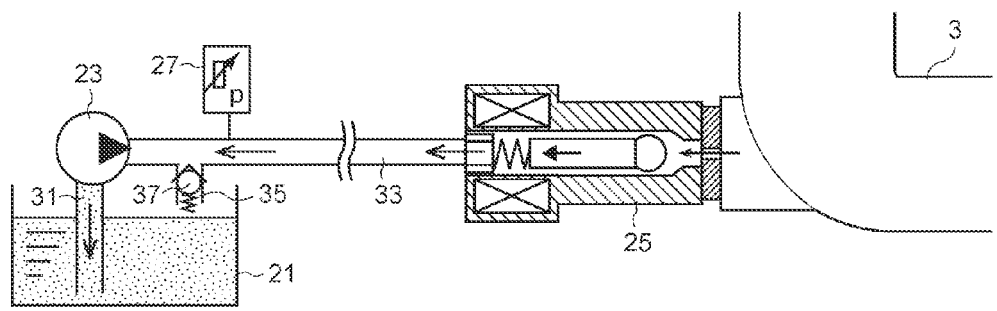
FIG. 4 is a diagram illustrating the state in the (second) reducing agent passage when the reducing agent injection valve is in a stuck-open condition.
Figure 4:
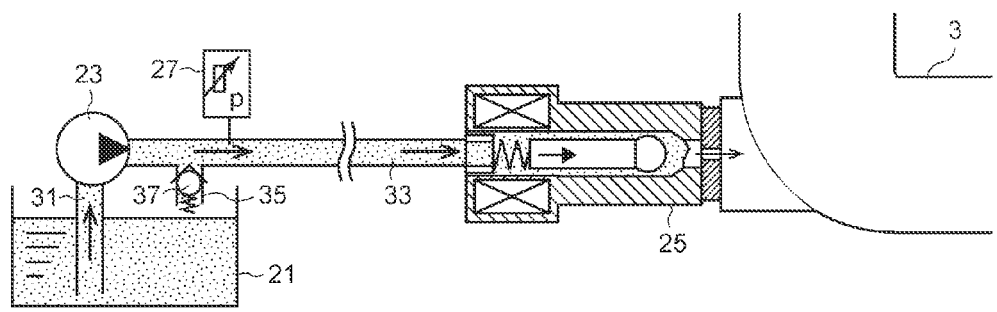
Figure 5:
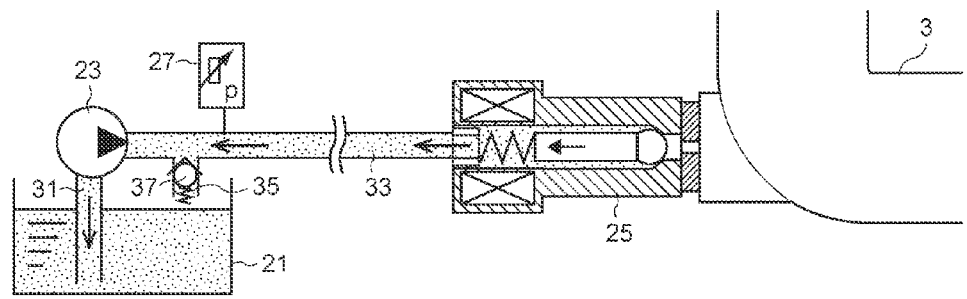
FIG. 5 is a diagram illustrating the state in the (second) reducing agent passage when the reducing agent injection valve is in a stuck-closed condition.
Figure 5:
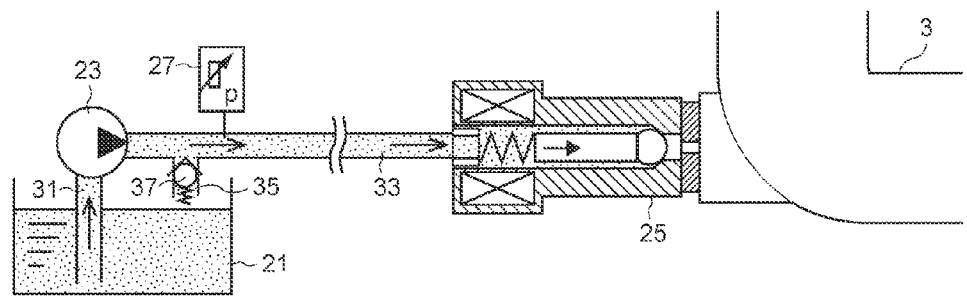

Here, FIGS. 3 to 5 illustrate the state in the second reducing agent passage 33 from the start of the purge process to the refilling with the reducing agent in a normal condition, a stuck-open condition and a stuck-closed condition, respectively.

First, FIGS. 3(*a*) and 3(*b*) show the state in the second reducing agent passage 33 when the reducing agent injection valve 25 is in a normal condition. In this case, the reducing agent injection valve 25 opens or closes in response to an instruction for opening or closing the valve from the control processing unit 40. Accordingly, during the purge process, through the injection nozzles, the reducing agent is collected while gas (air and exhaust gas) is introduced into the second reducing agent passage 33, so the reducing agent in the second reducing agent passage 33 is replaced by the gas. On the other hand, during the refilling of the reducing agent, since there is no way through which gas can move out in the second reducing agent passage 33, the second reducing agent passage 33 is refilled with the reducing agent while the gas in the second reducing agent passage 33 is being compressed.

FIGS. 4(*a*) and 4(*b*) show the state in the second reducing agent passage 33 when the reducing agent injection valve 25 is stuck open. In this case, the reducing agent injection valve 25 is kept open regardless of an instruction for opening or closing the valve from the control processing unit 40. Accordingly, during the purge process, through the injection nozzles, the reducing agent is collected while gas is introduced into the second reducing agent passage 33, so the reducing agent in the second reducing agent passage 33 is replaced by the gas. On the other hand, during the refilling of the reducing agent, the second reducing agent passage 33 is filled with the reducing agent while the gas in the second reducing agent passage 33 is being discharged into the exhaust pipe 3 through the injection nozzles.

FIGS. 5(*a*) and 5(*b*) show the state in the second reducing agent passage 33 when the reducing agent injection valve 25 is stuck closed. In this case, the reducing agent injection valve 25 is kept closed regardless of an instruction for opening or closing the valve from the control processing unit 40. Accordingly, during the purge process, the reducing agent in the second reducing agent passage 33 cannot be sucked back, and the reducing agent is left in the second reducing agent passage 33. On the other hand, during the refilling of the reducing agent, with the reducing agent left in the second reducing agent passage 33, the second reducing agent passage 33 is further filled with the reducing agent.

Figure 6:
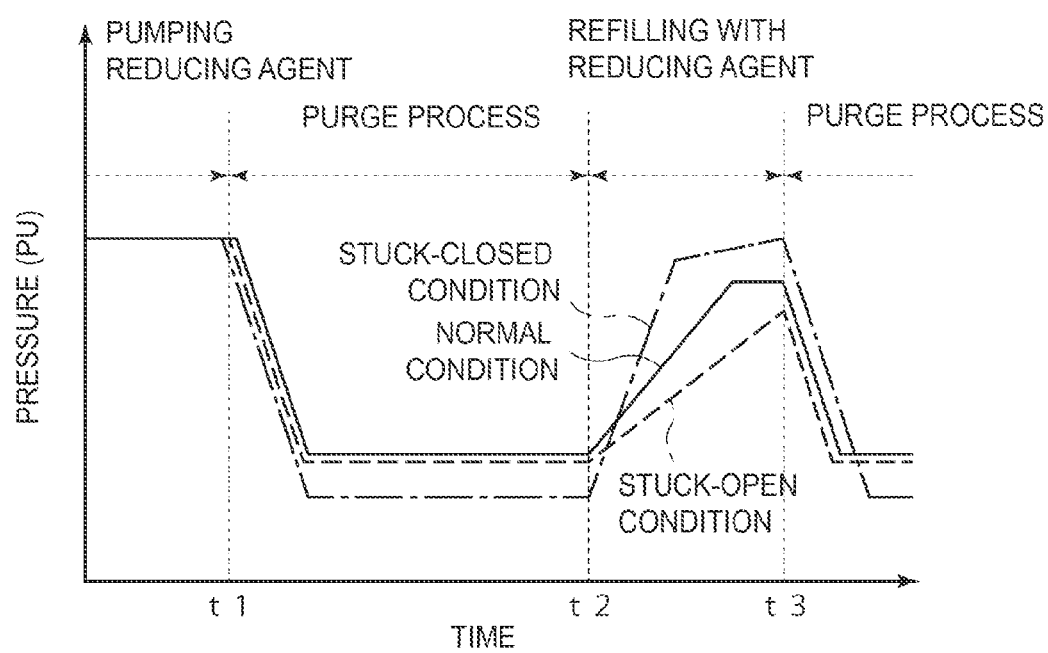
FIG. 6 is a diagram illustrating change in the pressure in the (second) reducing agent passage in the refilling with the reducing agent.

FIG. 6 shows transitions in the pressure Pu in the second reducing agent passage 33 in the normal, stuck-open and stuck-closed conditions of the reducing agent injection valve 25 shown in FIGS. 3 to 5, respectively. The solid line shows change in the pressure in the normal condition. The broken line shows change in the pressure in the stuck-open condition. The alternate long and short dash line shows change in the pressure in the stuck-closed condition.

In the period from t1 to t2 during which the purge process is being performed, the pump 23 is driven to depressurize the inside of the second reducing agent passage 33. At this time, the reducing agent injection valve 25 is open in the normal and stuck-open conditions, while the reducing agent injection valve 25 is closed in the stuck-closed condition, so the pressure Pu in the stuck-closed condition is smaller than the pressure Pu in the normal and stuck-open conditions.

Then, in the period from t2 to t3 during which the second reducing agent passage 33 is refilled with the reducing agent, the pump 23 is driven to pressurize the inside of the second reducing agent passage 33. At this time, since the compressibility of the reducing agent is larger than that of gas, the pressure Pu in the stuck-closed condition, in which a large amount of reducing agent is left in the second reducing agent passage 33, will increase more sharply than the pressure Pu in the normal and stuck-open conditions, in which the second reducing agent passage 33 is filled with gas.

On the other hand, even when the second reducing agent passage 33 is filled with gas, in the stuck-open condition, gas is discharged through the injection nozzles when the second reducing agent passage 33 is refilled with the reducing agent, and, in the normal condition, there is no way through which gas can move out, so the pressure Pu in the stuck-open condition increases more mildly than the pressure Pu in the normal condition.

Thus, whether or not the reducing agent injection valve is stuck open or closed can be determined from change in the pressure from the temporal purge process to the refilling with the reducing agent.

The determination of whether or not the stuck-open or stuck-closed condition has occurred, based on this change in the pressure can be performed by, for example, comparing the pressure after a predetermined time elapses or the pressure increasing rate or pressure increasing amount within a predetermined time or the like with a predefined determination threshold. However, any other method than illustrated here may be used.

4. Abnormality Determination Method of Reducing Agent Injection Valve

Next, an example of an abnormality determination method of the reducing agent injection valve 25 implemented by the control processing unit 40 of the embodiment is described with reference to the flowcharts shown in FIGS. 7 to 10. Among the figures, FIG. 7 shows the main flow of the abnormality determination method of the reducing agent injection valve 25 in the embodiment.

Figure 7:
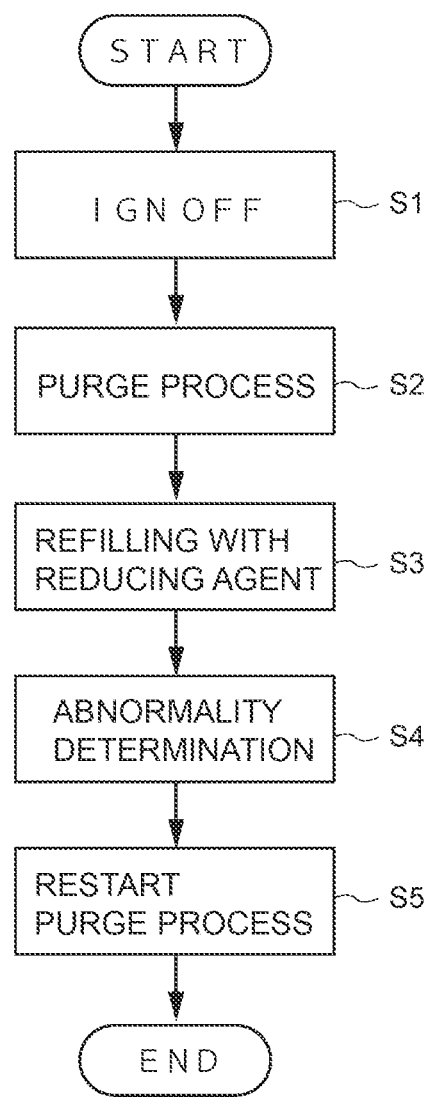
FIG. 7 is a flowchart showing an example of an abnormality determination method of the reducing agent injection valve.

First, when, in step S1 in FIG. 7, the control processing unit 40 detects that the ignition switch has been turned off, the purge process is performed in step S2 in which the reducing agent left in the reducing agent injection valve 25 and the second reducing agent passage 33 is collected into the storage tank 21.

Figure 8:
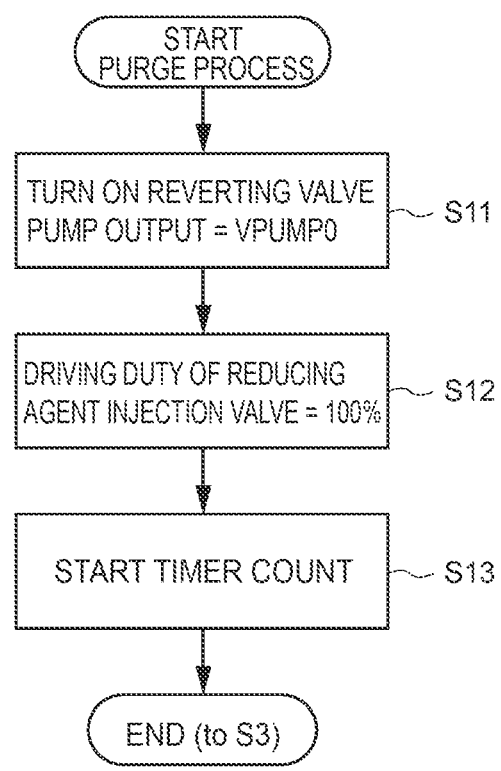
FIG. 8 is a flowchart showing a specific example of control for performing a purge process.

FIG. 8 shows an example of a specific flow for performing the purge process. In this flow example, first, in step S11, the control processing unit 40 starts energizing the reverting valve 24 to switch the passage so that the reducing agent flows from the reducing agent injection valve 25 side to the storage tank 21 side and sets the output Vpump of the pump 23 to a predetermined output Vpump0.

Next, the control processing unit 40, in step S12, sets the driving duty of the reducing agent injection valve 25 to 100% to issue a valve opening instruction, and then, in step S13, starts timer count. This starts depressurizing the inside of the reducing agent injection valve 25 and the second the reducing agent passage 33.

Returning to FIG. 7, after the start of the purge process, in step S3, the control processing unit 40 performs control so that the second reducing agent passage 33 is refilled with the reducing agent.

Figure 9:
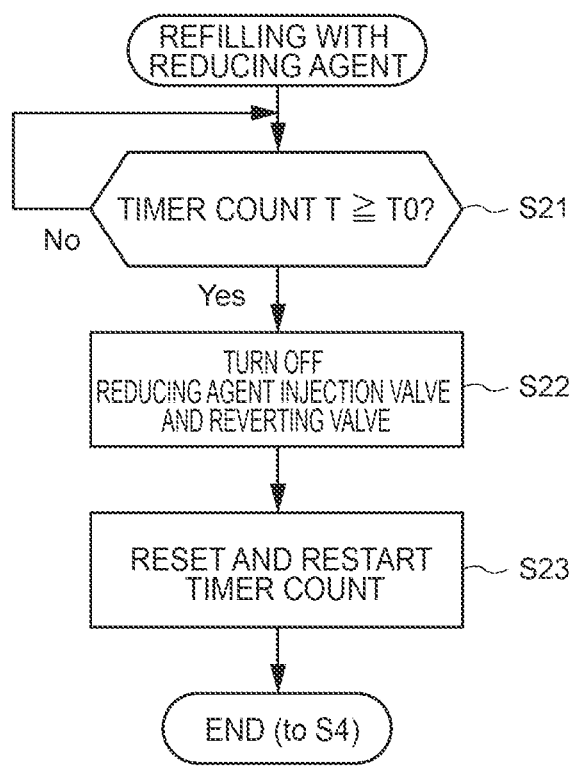
FIG. 9 is a flowchart showing a specific example of control for refilling with the reducing agent.

FIG. 9 shows an example of a specific flow for performing the refilling with the reducing agent. In this flow example, first, in step S21, the control processing unit 40 determines whether or not the timer count T started in step S13 in FIG. 8 has reached a predetermined reference value TO. Then, if determined that the timer count T has reached the reference value TO, the process proceeds to step S22 in which the control processing unit 40 stops energizing the reducing agent injection valve 25 while maintaining the output of the pump 23 and stops energizing the reverting valve 24 to switch the passage so that the reducing agent flows from the storage tank 21 side to the reducing agent injection valve 25 side. Next, in step S23, the control processing unit 40 resets the timer count, then restarts the timer count. This starts causing the reducing agent injection valve 25 and the second reducing agent passage 33 to be refilled with the reducing agent.

Returning to FIG. 7, after the start of the refilling with the reducing agent, in step S4, the control processing unit 40 performs abnormality determination of the reducing agent injection valve 25.

Figure 10:
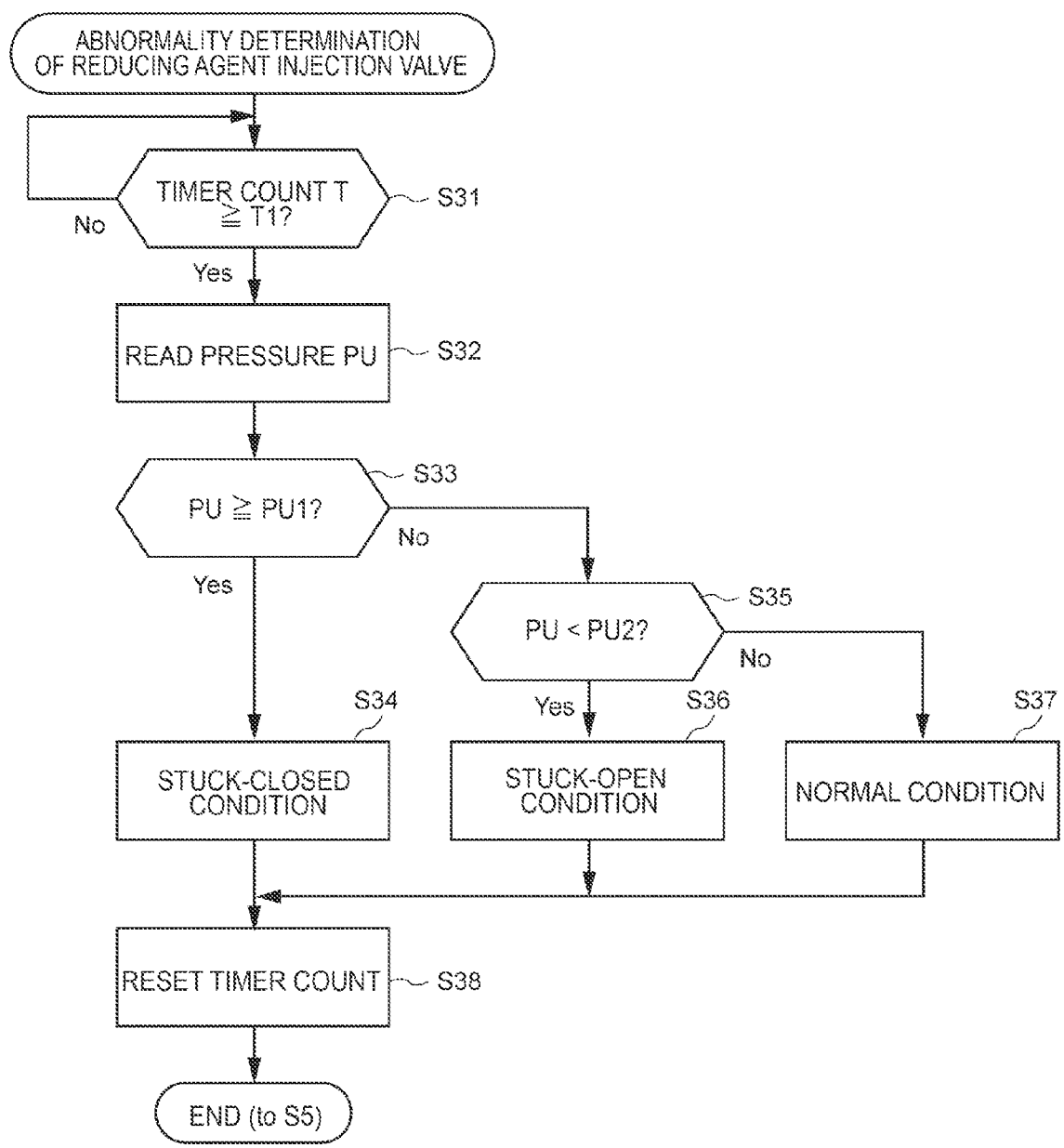
FIG. 10 is a flowchart showing a specific example of abnormality determination of the reducing agent injection valve.

FIG. 10 shows an example of a specific flow for performing the abnormality determination of the reducing agent injection valve 25. In this flow example, first, in step S31, the control processing unit 40 determines whether or not the timer count T started in step S23 in FIG. 9 has reached a predetermined reference value T1. Then, if determined that the timer count T has reached the reference value T1, the process proceeds to step S32 in which the control processing unit 40 detects the pressure Pu in the second reducing agent passage 33, then, in step S33, determines whether or not the detected pressure Pu is equal to or more than a first determination threshold Pu1.

The first determination threshold Pu1 is a threshold for determining whether or not the stuck-closed condition has occurred in the reducing agent injection valve 25, which is a value that is previously determined through an experiment or the like and stored. If determined that the detected pressure Pu is equal to or more than the first determination threshold Pu1, the process proceeds to step S34 in which the control processing unit 40 sets a flag for indicating the occurrence of the stuck-closed condition, then, in step S38, resets the timer count to finish the abnormality determination. On the other hand, if determined that the detected pressure Pu is less than the first determination threshold Pu1, the process proceeds to step S35 in which it is determined whether or not the detected pressure Pu is less than a second determination threshold Pu2.

The second determination threshold Pu2 is a threshold for determining whether or not the reducing agent injection valve 25 is stuck open, which is a value that is previously determined through an experiment or the like and stored. If determined that the detected pressure Pu is less than the second determination threshold Pu2, the process proceeds to step S36 in which the control processing unit 40 sets a flag for indicating the occurrence of the stuck-open condition, then, in step S38, resets the timer count to finish the abnormality determination. On the other hand, if determined that the detected pressure Pu is equal to or more than the second determination threshold Pu2, the process proceeds to step S37 in which the control processing unit 40 resets both the flags for indicating the stuck-open and stuck-closed conditions, then, in step S38, resets the timer count to finish the abnormality determination.

In the example flow of the abnormality determination described above, the pressure Pu after a predetermined time elapses from the start of filling with the reducing agent is compared with the first and second determination thresholds Pu1 and Pu2 to determine whether or not the stuck-open or stuck-closed condition has occurred. However, as previously described, the abnormality determination may also be performed by determining the increasing rate or increasing amount of the pressure in a predetermined period and comparing the rate or amount with a predetermined determination threshold.

Returning to FIG. 7, after the abnormality determination finishes, the control processing unit 40, in step S5, again starts energizing the reducing agent injection valve 25 and the reverting valve 24 to restart the purge process. Then, after a predetermined time elapses, the pump 23 is stopped being driven and the purge process finishes. This completely stops the operation of the reducing agent supply apparatus 20. During this period, an indication signal for notifying an operator or the like of an occurrence of abnormality may be generated in response to the fact that the reducing agent injection valve 25 is stuck open or stuck closed.

According to the reducing agent injection valve abnormality detection unit and the reducing agent supply apparatus of the embodiment described above, the stuck-open or stuck-closed condition of the reducing agent injection valve can distinctively and precisely detected based on the difference between changes in the pressure in the stuck-open, stuck-closed and normal conditions. Furthermore, in the embodiment, the abnormality determination is performed utilizing the purge process performed when the internal-combustion engine stops, so the abnormality determination can be performed without interrupting the reducing agent injection control during the operation of the internal-combustion engine 1.

The invention claimed is:

1. An apparatus for detecting whether a reducing agent injection valve is abnormally stuck, the apparatus comprising:
   a reducing agent supply apparatus including
      a storage tank for storing a liquid reducing agent,
      a pump for pumping the reducing agent,
      a reverting valve for controlling the flow of the reducing agent;
      a reducing agent injection valve for injecting the reducing agent pumped by the pump into an exhaust pipe of an internal-combustion engine, and
      a reducing agent passage connecting the pump to the reducing agent injection valve; and
   a control processing unit including
      a processor,
      a memory,
      a drive circuit for energizing the pump, and
      a drive circuit for energizing the reverting valve;
   wherein the control processing unit, when an instruction for opening the reducing agent injection valve has been issued, actuates the drive circuit for energizing the reverting valve to operate the reverting valve such that it causes a collection of the reducing agent into the storage tank from the reducing agent passage; and
   wherein the control processing unit, when an instruction for closing the reducing agent injection valve has been issued after the reducing agent has been collected into the storage tank, actuates the drive circuit for energizing the reverting valve to operate the reverting valve such that it causes a refilling of the reducing agent passage with the reducing agent; and
   wherein the control processing unit determines whether the reducing agent injection valve is abnormally stuck, based on a change in a pressure in the reducing agent passage during the refilling of the reducing agent passage with the reducing agent.

2. The apparatus according to claim 1, wherein the control processing unit can determine both whether the reducing agent injection valve is stuck open and whether the reducing agent injection valve is stuck closed, based on the change in the pressure.

3. The apparatus according to claim 1, wherein a determination of whether the reducing agent injection valve is abnormally stuck is implemented when the collection of the reducing agent is performed at the stop of the internal-combustion engine.

4. The apparatus according to claim 2, wherein a determination of whether the reducing agent injection valve is abnormally stuck is implemented when the collection of the reducing agent is performed at the stop of the internal-combustion engine.

\* \* \* \* \*